United States Patent [19]
Wiederhold et al.

[11] Patent Number: 5,660,280
[45] Date of Patent: Aug. 26, 1997

[54] VARIABLE THICKNESS PLASTIC MOLDED FOOD SERVICE TRAY USED IN RETHERMALIZATION CABINET

[75] Inventors: Steven H. Wiederhold, Neshanic Station; Clifford M. Oelfke, Jamesburg, both of N.J.

[73] Assignee: Seco Products Corporation, Washington, Mo.

[21] Appl. No.: 527,944

[22] Filed: Sep. 14, 1995

[51] Int. Cl.$^6$ ................................. B65D 85/72
[52] U.S. Cl. ................ 206/549; 206/541; 206/564
[58] Field of Search ........................ 206/541, 545, 206/546, 549, 564; 220/555

[56] References Cited

U.S. PATENT DOCUMENTS

| | | | |
|---|---|---|---|
| Re. 30,962 | 6/1982 | Bridges | 206/564 |
| 3,295,737 | 1/1967 | Page et al. | 206/564 |
| 3,942,671 | 3/1976 | Florian | 206/564 |
| 4,776,485 | 10/1988 | Brennan | 206/564 |
| 5,093,556 | 3/1992 | Oelfke | 219/386 |
| 5,396,046 | 3/1995 | Oelfke | 219/386 |

FOREIGN PATENT DOCUMENTS 6-135465  5/1994  Japan ................ 206/564

*Primary Examiner*—Jimmy G. Foster
*Attorney, Agent, or Firm*—Herzog, Crebs & McGhee, LLP

[57] ABSTRACT

A food service tray for a thermalization cart is injection molded as a one-piece integral tray. The tray includes a plurality of integral compartments some of which are for the placement of food items that are going to be heated (a heatable or hot compartment), the other compartments of which are for the placement of food items that will remain cold (a cold compartment). The bottom wall of each of the heatable compartments is of less thickness than the bottom wall of each of the cold compartments. Additionally, the upper surfaces of the bottom walls of each of the heatable compartments are in a first common plane that is coplanar to a second common plane formed by the bottom surfaces of the bottom walls of each of the cold compartments. Therefore, the bottom surfaces of the bottom walls of the heatable compartments are naturally in a third common plane that is axially below the second common plane. The tray includes integrally molded supporting webs or gate bosses between the heatable compartments to provide rigidity and integrity to the tray due to the variable thickness bottom surface of the tray.

5 Claims, 2 Drawing Sheets

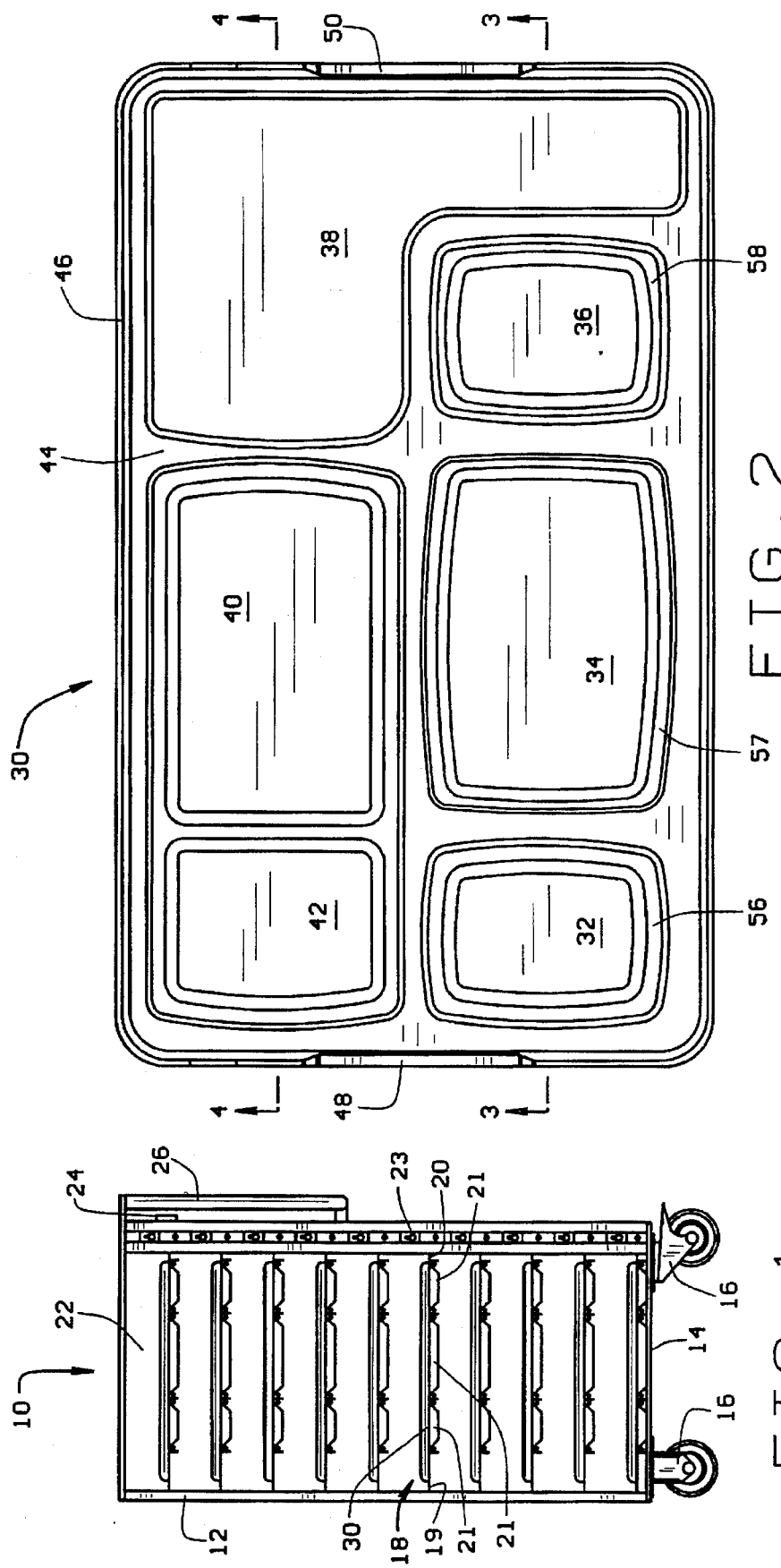

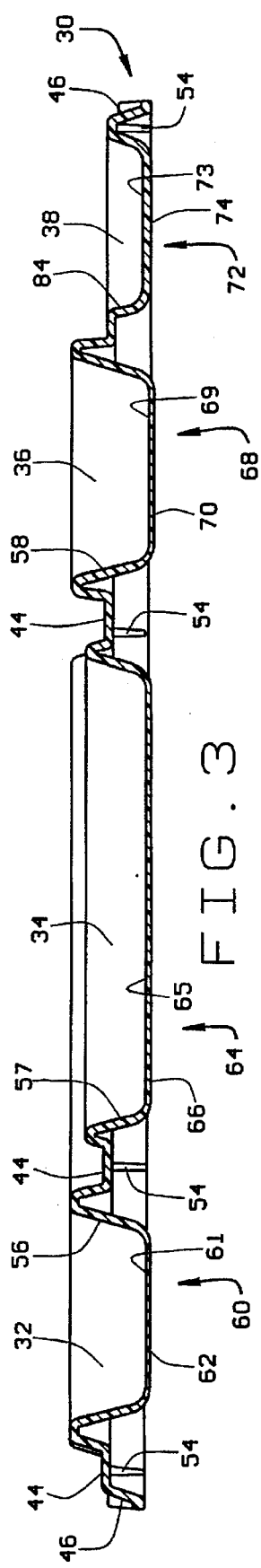
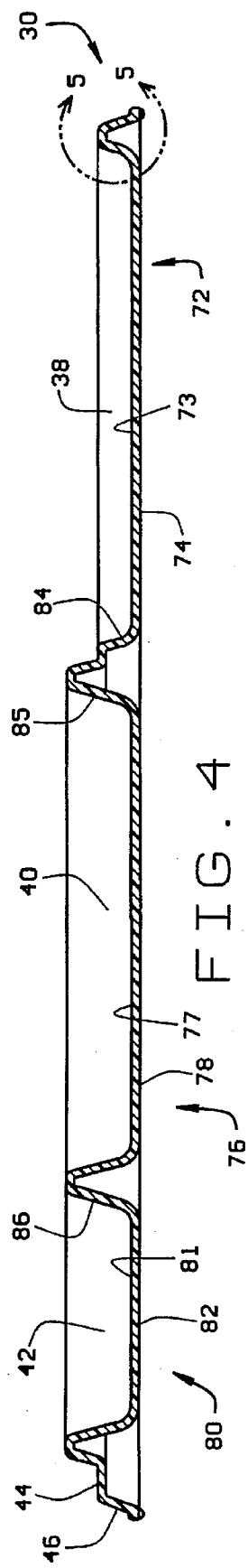
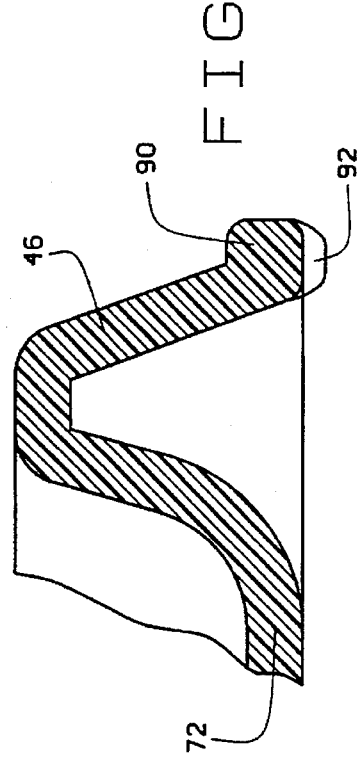

VARIABLE THICKNESS PLASTIC MOLDED FOOD SERVICE TRAY USED IN RETHERMALIZATION CABINET

FIELD OF THE INVENTION

The present invention relates to food service serving trays and, more specifically to food service trays for thermalization carts.

BACKGROUND OF THE INVENTION

Hotels, institutional environments such as nursing homes and hospitals, prisons, and the like use heat retentive food serving systems for individually feeding the guests, patients, inmates or the like. These heat retentive food serving systems are designed to keep previously heated food warm prior to serving. Generally there is a period of time between when the food is either prepared or heated up to when the food is served. This situation comes about because in many circumstances the food must be delivered to the person. Also, the sheer number of people required to be fed might be quite large.

Accordingly, the prior art is replete with devices for keeping warmed food warm until the food can be served. These food service devices or products for keeping food warm can be divided into two types or categories. The first type is a heat retentive server that generally includes an insulated server base and an insulated cover or dome. The server base may be designed to hold a plate, in which case the base is known as a pellet base. A pellet base, cover, and plate is known as a pellet system.

The server or pellet base may include a solid heat sink or a phase change medium. These servers or pellet bases are initially heated to a proper temperature wherein the heat is stored for gradual dissipation during passive release of the stored heat. The released heat thus transfers to the plate and the food on the plate.

The other type of food service product is known as a thermalization cart or cabinet. The thermalization cart is designed to receive and store a plurality of trays, with each tray holding an entire meal that has been previously placed thereon. Once loaded, the entire thermalization cart is placed in a walk-in refrigerator or the like for storage. Many such carts may be prepared and stored depending on the number of people to be fed. This allows for the individual preparation of the entire meal well in advance of the day of feeding. Once it is desired to serve the meals, a heating control unit is activated to begin heating only the food desired to be heated. The thermalization cart remains in the refrigerator such that the cold food remains cold while the food to be warmed is heated.

Heating is achieved within the thermalization cart by individual heating elements that are associated with each shelf. Each shelf includes a number of heating pads corresponding to the areas on the trays where the food to be heated is placed. When the trays are place on the shelf, the heating pads are aligned directly below the particular food to be heated and thus served hot. In this manner, only the food that is to be heated is heated, while the rest of the food remains cold.

In order for the food to be heated, the prior art trays for thermalization carts have cutout portions for plates or other types of containers. The food to be heated is placed upon the plate or in the container. With the prior art, trays with only specially designed china plates can be used. The plates have flat bottoms for efficient contact with the heating unit, while conforming in size and shape to the cutout portion in the tray. Furthermore, the prior art requires the purchase, washing, and maintenance of extra items, not just the tray.

In view of the prior art shortcomings in thermalization cart trays, it is an object of the present invention to provide a tray that reduces the number of pieces associated with the prior art trays.

It is further an object of the present invention to provide a molded plastic tray eliminating the cutout portions wherein the tray has a variable thickness bottom wall to allow the cold food to remain cold while the other food is heated.

It is another object of the present invention to provide a one-piece tray for a thermalization cart from which food may be directly eaten. Such a tray may be used at hospitals, nursing homes, prisons, and the like.

SUMMARY OF THE INVENTION

A food service tray for a thermalization cart is formed to transfer as much heat as possible to the food to be heated without transferring heat to the cold food. The tray includes a plurality of recessed compartments with openings for receipt of food items or covered containers of food. A predetermined number of recessed compartments are molded so as to be heatable compartments. The remaining compartments are for the receipt of cold or room temperature food items or containers of food.

The heatable compartments of the tray correspond in number and placement to the number and placement of heating pads on a shelf in an associated thermalization cart. The position and number of heatable compartments on the tray are variable per the teachings of the present invention. However, the position and number of heatable compartments on the tray will normally correspond to the number and position of associated heating pads on each shelf of the thermalization cart. The tray is preferably injection molded as one piece, but can be thermaformed.

In accordance with the teachings of the present invention, the bottom wall of each of the heatable compartments is of less thickness than the bottom wall of each of the cold compartments. Additionally, the upper surfaces of the bottom walls of each of the heatable compartments are in a first common plane that is coplanar to a second common plane formed by the bottom surfaces of the bottom walls of each of the cold compartments. Therefore, the bottom surfaces of the bottom walls of the heatable compartments are naturally in a third common plane that is axially below the second common plane. In this manner, contact between the bottom wall of each of the heatable compartments with the heating pads is assured to provide reliable heating of the food therein, while the food within the cold compartments remains at room temperature.

The tray includes integrally molded supporting webs or gate bosses between the heatable compartments to provide rigidity and integrity to the tray due to the variable thickness bottom surface of the tray.

In one form, the tray is molded to provide less thick bottom walls for the heatable food compartments than the cold food compartments. The heatable compartment side walls taper from the same thickness as the cold compartment walls to the less thick bottom wall. This is accomplished by injection molding the tray in a special mold design that provides for the variations in wall thickness.

Because some of the food is to remain cold, and the thermalization cart remains in the refrigerator, the tray is designed such that the heatable compartments have a less thick bottom wall than the bottom walls of the cold compartments. Since plastic is a poor conductor of heat, the heat will seek other objects in which to transfer the heat. Because the cold food compartments have thicker walls than the hot food compartments, the heat will be conducted to the food in the hot food compartments rather than through the thicker plastic of the walls of the cold food compartments.

BRIEF DESCRIPTION OF THE DRAWINGS

So that the manner in which the above-recited features, advantages, and objects of the present invention are attained and can be understood in detail, a more particular description of the invention, briefly summarized above, may be had by reference to the embodiment thereof which is illustrated in the appended drawings.

It is noted, however, that the appended drawings illustrate only a typical embodiment of this invention and is therefore not to be considered limiting of its scope, for the invention may admit to other equally effective embodiments. Reference the appended drawings, wherein:

FIG. 1 is a side view of a typical thermalization cart having a plurality of shelves each having a set number of heating pads and supporting a tray;

FIG. 2 is a top plan view of the present tray;

FIG. 3 is an enlarged sectional side view of the present tray taken along line 3—3 of FIG. 2;

FIG. 4 is an enlarged sectional side view of the present tray taken along line 4—4 of FIG. 2; and FIG. 5 is an enlarged sectional segment of the side of the present tray taken along circle 5—5 of FIG. 4.

DETAILED DESCRIPTION

Referring now to FIG. 1 a thermalization cart 10 is shown in which the present invention is used. The cart 10 is defined by an aluminum frame 12 that is movably supported at a bottom wall 14 by four caster wheels 16 of which only two such wheels 16 are shown. The frame 12 supports a plurality of shelves, each shelf of which is generally designated 18. Each shelf 18 is defined by a left bracket 19 and a right bracket 20. Each of the brackets 19, 20 extend the distance from the front inward to the center panel 22 thereby forming the shelf 18. It should be understood that the typical thermalization cart 10 includes a front and rear opening such that there are two columns of shelves separated by a middle or center wall or panel. Thus, the following description applies equally to the rear of the cart 10 which is not shown. Coupled to and extending from the rear panel 22 of the cart 10 are a plurality of sets of controlled heating pads 21, the number of sets of heating pads 21 corresponding in number to the number of shelves 18. Each shelf 18 thus has an associated set of heating pads 21.

The cart 10 shown in FIG. 1, each heating pad set includes three (3) heating pads 21. The heating pads 21 are aligned with the shelf brackets 19, 20 such that when a tray 30 is placed on the shelf 18 the heating pads 21 are therebelow and in selective contact with the bottom surface of the tray 30. This is explained in greater detail hereinbelow in conjunction with the explanation of the operation of the cart 10 and the present invention. Each set of heating pads 21 is coupled to a separate heating control 23 that is coupled to a master control panel (not shown) through an interface plug 24. A push bar 26 is provided around the plug 24. Thus, each set of heating pads 21 may be separately controlled depending on whether there is or is not a tray of food to be warmed per shelf.

For more particulars regarding the thermalization cart 10 reference is made to U.S. Pat. No. 5,093,556 entitled Rethermalization Cart Assembly issued Mar. 3, 1992, to Clifford M. Oelfke and assigned to Therma-Chill of South Plainfield, N.J., and U.S. Pat. No. 5,396,046 entitled Rethermalization Cart Assembly issued Mar. 7, 1995 to Clifford M. Oelfke and assigned to Therma-Chill of South Plainfield, N.J. the specifications of which are specifically incorporated herein by reference.

Referring now to FIG. 2 a tray embodying the teachings of the present invention, generally designated 30 is shown. It should be understood that the tray 30 as shown is designed for the cart 10 in FIG. 1 in that the cart 10 has three (3) heating pads 21 per set (shelf), however, a tray may be fashioned in accordance with the present teachings for a thermalization cart having more or less heating pads. The tray 30 is preferably formed by injection molding a suitable plastic, such as a Mindel® S-1020 plastic from Amoco Performance Products, Inc. of Ridgefield, Conn., because of its high heat deflection properties. The Mindel® S-1020 is a glass-filled material (plastic) which is formed by the addition of glass fibers to the base Mindel® S-1000 plastic. The Mindel® S-1020 plastic has added strength, less warpage during a thermal change, and better heat transfer because of the glass fibers over the Mindel® S-1000. The tray 30 is injection molded flat or horizontally for the particular plastic resin to flow. Other types of impact and high heat resistant engineered resins may be used such as engineered polysulfones. Other known usable plastics include Radel® by Amoco or Ultem® by GE.

The tray 30 has an upper or top surface 44 and six (6) integrally formed recessed compartments 32, 34, 36, 40, and 42. It should be understood that the compartments 32, 34, 36, 38, 40, 42 are rectangles, the compartments may take essentially any shape as desired such as compartment 38, with the number of compartments being variable. In the embodiment as depicted in FIG. 2, the compartments 32, 34, and 36 are hot, heating, or heatable compartments, while the compartments 38, 40, and 42 are cold or nonheating compartments. The position and shape of the heating compartments 32, 34, 36 correspond to the position and shape of a set of the heating pads 21 within the cart 10. Thus, when the tray 30 is placed on the shelf 18 of the cart 10, the heatable compartments 32, 34, 36 rest on appropriate heating pads 21. The contact between the heating pads 21 and the bottom surface of the heatable compartments 32, 34, 36 ensure proper heat transfer. The tray 30 also includes a downturned peripheral edge 46 with a left raised holding portion 48 and a right raised holding portion 50 for assistance in carrying the tray 30.

Referring now to FIG. 3, a cross section of the tray 30 taken along line 3—3 of FIG. 2 is depicted. In accordance with one aspect of the present invention, the tray includes integrally molded gate bosses or reinforcing flanges 54 extending from the underside of the top surface 44 adjacent the heatable compartments 32, 34, 36. The flanges 54 extend along the underside of the tray 30.

As indicated above, the tray 30 includes three (3) heatable compartments 32, 34, and 36 and although they share a common bottom wall with the entire bottom wall of the tray, the thickness of the bottom wall of the heatable compartments 32, 34, 36 varies in accordance with another aspect of the present invention. With particular reference to FIG. 3, the compartment 32 has a bottom wall 60 that defines an upper wall surface 61 and a lower wall surface 62. The upper wall surface 61 forms the bottom of the compartment 32. In the preferred embodiment, the thickness of the bottom wall 60 is 0.060" and covers the entire bottom dimension of the compartment 32. The compartment 34 has a bottom wall 64 that defines a top wall surface 65 and a lower wall surface 66. The upper wall surface 65 forms the bottom of the compartment 34. Likewise, in the preferred embodiment, the thickness of the bottom wall 64 is 0.060" and covers the entire bottom dimension of the compartment 34. The compartment 36 has a bottom wall 68 that defines a top wall surface 69 and a lower wall surface 70. The upper wall surface 69 forms the bottom of the compartment 36. Again, in the preferred embodiment, the thickness of the bottom wall is 0.060". Each compartment 32, 34, 36 is further defined by a surrounding wall 56, 57, 58 respectively, that has a thickness greater than the bottom walls 60, 64, 68. In the preferred embodiment, the thickness of the surrounding walls 56, 57, 58 is 0.125" which naturally taper to the thickness of the respective bottom walls 60, 64, 68. The upper surfaces 61, 65, and 69 together define a first common plane, while the lower surfaces 62, 66, and 70 together define a second common plane that is parallel to the first common plane.

The compartment 38 as stated above is a non-heating or cold compartment. The compartment 38 includes a bottom wall 72 that defines an upper wall surface 73 and a lower wall surface 74 and which is contiguous with a surrounding wall 84 of the same thickness. The upper wall surface 73 forms the bottom of the compartment 38. In the preferred embodiment, the bottom wall 72 has a thickness of 0.125" which is greater than the respective bottom walls 60, 64, 68 of the heatable compartments 32, 34, 36. With additional reference to FIG. 4 the other cold compartments 40, 42 are shown in cross-section. The compartment 40 includes a bottom wall 76 that defines an upper surface 77 and a lower surface 78 and which is contiguous with a surrounding wall 85 of the same thickness. The upper wall surface 77 forms the bottom of the compartment 40. In the preferred embodiment, the bottom wall 76 has a thickness of 0.125" which is greater than the respective bottom walls 60, 64, 68 of the heatable compartments 32, 34, 36. The compartment 42 includes a bottom wall 80 that defines an upper surface 81 and a lower surface 82 that is contiguous with a surrounding wall 86 of the same thickness. The upper wall surface 81 forms the bottom of the compartment 42. In the preferred embodiment, the bottom wall 80 has a thickness of 0.125" which is greater than the respective bottom walls 60, 64, 68 of the heatable compartments 32, 34, 36.

The lower surfaces 74, 78, 82 of the respective bottom walls 72, 76, and 80 of the respective cold compartments 38, 40, 42 forms a third common plane. The third common plane thereby formed is coplanar with the first common plane defined by the upper surfaces 61, 65, and 69 of the compartments 32, 24, 36. In other words, the heatable compartments 32, 34, and 36 have bottom walls 60, 64, 68 respectively, that are axially or vertically below the bottom surfaces 74, 78, 82 of the bottom walls 72, 76, 80 of the cold compartments 38, 40, 42.

As best seen in FIG. 5, the tray 30 further includes an outer peripheral bulbous rim 90 that extends from the peripheral edge 46. Disposed on the underside of the rim 90 is a lower peripheral lip 92 that extends below the third common plane formed by the lower wall surfaces 74, 48, 82. This lip 92 helps seat the tray 30 when stored on a shelf 18 in the cart 10. It should be understood that the present tray 30 is injection molded as one piece with variable thickness bottom walls.

In operation, the tray 30 is inserted onto a shelf 18 of the cart 10 such that the heatable compartments 32, 34, and 36 align over the appropriate heating pads 21. The cold compartments 38, 40, 42 are suspended in the cart 10 without an associated heating pad 21. During storage of the cart 10 in the walk-in refrigerator or the like, all of the previously prepared food is cold and situated on the tray 30. The food to be heated is placed in one of the heatable compartments 32, 34, 36, while the food necessary to remain cold or at room temperature is place in one of the cold compartments 38, 40, 42. When it is desired to serve the meals, the control (not shown) is activated which actuates the heating pads 21 to heat the food within the heatable compartments 32, 34, 36 by conduction through the respective bottom walls 60, 64, 68. The thick walls of the cold compartments 38, 40, 42 do not permit the heat from the heating pads to warm the food therein.

While the foregoing is directed to the preferred embodiment of the present invention, other and further embodiments of the invention may be devised without departing from the basic scope thereof, and the scope thereof is determined by the claims which follow.

What is claimed is:

1. A food service tray for a thermalization cart, the tray comprising:

a one-piece plastic substrate; and a plurality of integrally molded recessed compartments in said plastic substrate, said compartments divided into heatable compartments and cold compartments, said cold compartments having a bottom wall of a first thickness, and said heatable compartments having a bottom wall of a second thickness less than said first thickness, each said bottom wall of said heatable compartments being axially lower than each said bottom wall of said cold compartments.

2. A food service tray for use with a thermalization cart, the tray characterized by an injection-molded plastic substrate of variable thickness, a plurality of recessed heatable compartments each having a bottom wall of a first thickness, and a plurality of cold compartments each having a bottom wall of a second thickness that is greater than said first thickness, each said bottom wall of said heatable compartments being axially below each said bottom wall of said cold compartments.

3. The tray of claim 2, further comprising:

a peripheral lip downwardly extending from an underside of said substrate; and a plurality of reinforcing ribs on said underside of said substrate, said ribs disposed adjacent said heatable compartments.

4. A food service rethermalization tray adapted to receive food directly thereon, the tray comprising:

an integral, one-piece plastic substrate;

a plurality of integrally molded recessed compartments in said plastic substrate, said compartments consisting of heatable food compartments and cold food compartments, said heatable food compartments having coplanar bottom walls that are axially lower than coplanar bottom walls of said cold food compartments; and a peripheral lipped edge axially higher than said coplanar bottom walls of said heatable food compartments and at least axially coplanar with said coplanar bottom walls of said cold food compartments.

5. The tray of claim 4, wherein said heatable food compartments are separated from each other and said cold food compartments by lands having integral flanges on an underside thereof, and said cold food compartments are separated from each other by folds.

* * * * *